AUTOMATIC TELEPHONE SWITCHING DEVICE

Filed April 5, 1967 4 Sheets-Sheet 1

INVENTOR.
LOUIS PONTECORVO
BY Anderson & Thomas
ATTORNEYS

May 26, 1970 L. PONTECORVO 3,514,545

AUTOMATIC TELEPHONE SWITCHING DEVICE

Filed April 5, 1967 4 Sheets-Sheet 2

INVENTOR.
LOUIS PONTECORVO

BY Auslander & Thomas

ATTORNEYS

INVENTOR.
LOUIS PONTECORVO
BY Auslander & Thomas
ATTORNEYS

INVENTOR.
LOUIS PONTECORVO
BY Auslander & Thomas
ATTORNEYS

United States Patent Office
3,514,545
Patented May 26, 1970

3,514,545
AUTOMATIC TELEPHONE SWITCHING DEVICE
Louis Pontecorvo, 211–13 33rd Ave., Bayside, N.Y. 11361
Filed Apr. 5, 1967, Ser. No. 628,750
Int. Cl. H04
U.S. Cl. 179—18 15 Claims

ABSTRACT OF THE DISCLOSURE

An automatic telephone switching device preferably employed with a card dialer having an encoded card comprising the initiation of a circuit by the signal on one of the service lines of a telephone switched to by-pass the ring signal of the phone, the circuit made through a series of relays to power means which preferably actuates a partially cogged gear into active engagement with a rack to drive the encoded card into the card dialer, means to cut off the incoming signal after redialing by the card dialer, transfer of the incoming call to a second service line and cams on the gears adapted to open switches to cut off the power means after its driving of the card into the re-dialer, the cams further adapted to break the circuit to the power means which is initiated upon the cessation of the retransmitted call so as to place the device in reset position for subsequent calls.

AUTOMATIC TELEPHONE SWITCHING DEVICE

The present invention relates to an automatic telephone switching device adapted to receive a call and retransmit the call to a predetermined second station.

In the past, if a telephone subscriber was absent from his place of business or other area where his telephone was located, callers to the subscriber's telephone station were oftentimes faced with the problem of locating the subscriber. In many instances, answering services or other systems relayed to the caller to location of the subscriber so that the caller could re-dial or otherwise await a response from the subscriber; however, the transfer of the caller to the subscriber was time consuming and oftentimes caused the caller to bear the expense of multiple callings. If the subscriber was located in an area having a greater toll charge, it was then necessary, if the caller wished to reach the subscriber, for the caller to bear this greater expense.

While relaying devices were developed they required the installation of complicated re-dialing structure separate and apart from the automatic dialing systems presently known in the art such as shown in U.S. Pat. No. 3,124,659 to Andregg and other patents relating to similar devices and improvements thereon.

As is known in the art, a person who wishes to initiate a call may employ a device such as shown in Andregg supra by the insertion of an encoded card into a card reading device wherein sensors within the device accept the information on the card and transmit signals over a telephone circuit to initiate a call.

According to the present invention an incoming call to a subscriber acts as the initiating signal for the actuation of the automatic dialing system which upon actuation redials and transfers the incoming call to a desired second location, and upon completion of the call resets to its starting position so as to relay any additional calls made to the subscriber.

By maintaining the integrity of the automatic dialing systems as presently known in the art, such equipment may be employed by a subscriber in its normal functional manner as an automatic dialing system where the relaying device is not being used.

By provision of a bypass switch, the system of the present invention bypasses the closed cradle of the telephone and upon actuation by standard telephone lines, feeds the signal through a series of relays actuating the redialing mechanism, the redialed signal then being fed back through the telephone lines to interconnect the caller with the desired receiving station. When the initiating telephone disconnects, the relays are released and the redialing mechanism resets.

The drive for the redialing system provides a gear and cam arrangement adapted to drive a rack to actuate the encoded card through the redialing mechanism.

Although such novel feature or features believed to be characteristic of the invention are pointed out in the claims, the invention and the manner in which it may be carried out may be further understood by reference to the description following and the accompanying drawings.

Figures 2, 3, 3A:
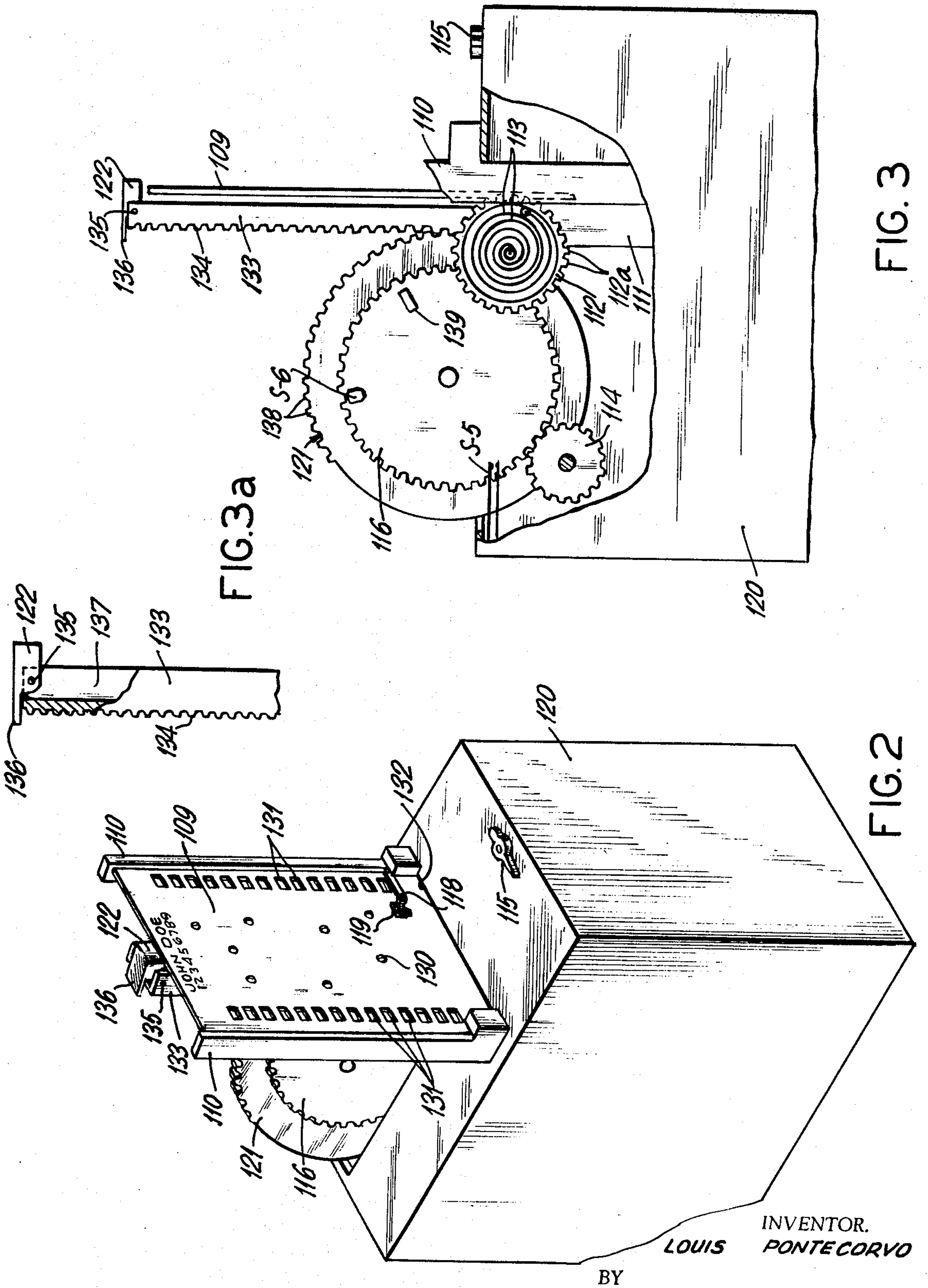
FIG. 2 is a perspective view of the present invention.
FIG. 3 is a detail partly in section of an alternate embodiment of the present invention.

FIG. 3*a* is a detail of a rack and lip arrangement of FIG. 3.

Figure 1:
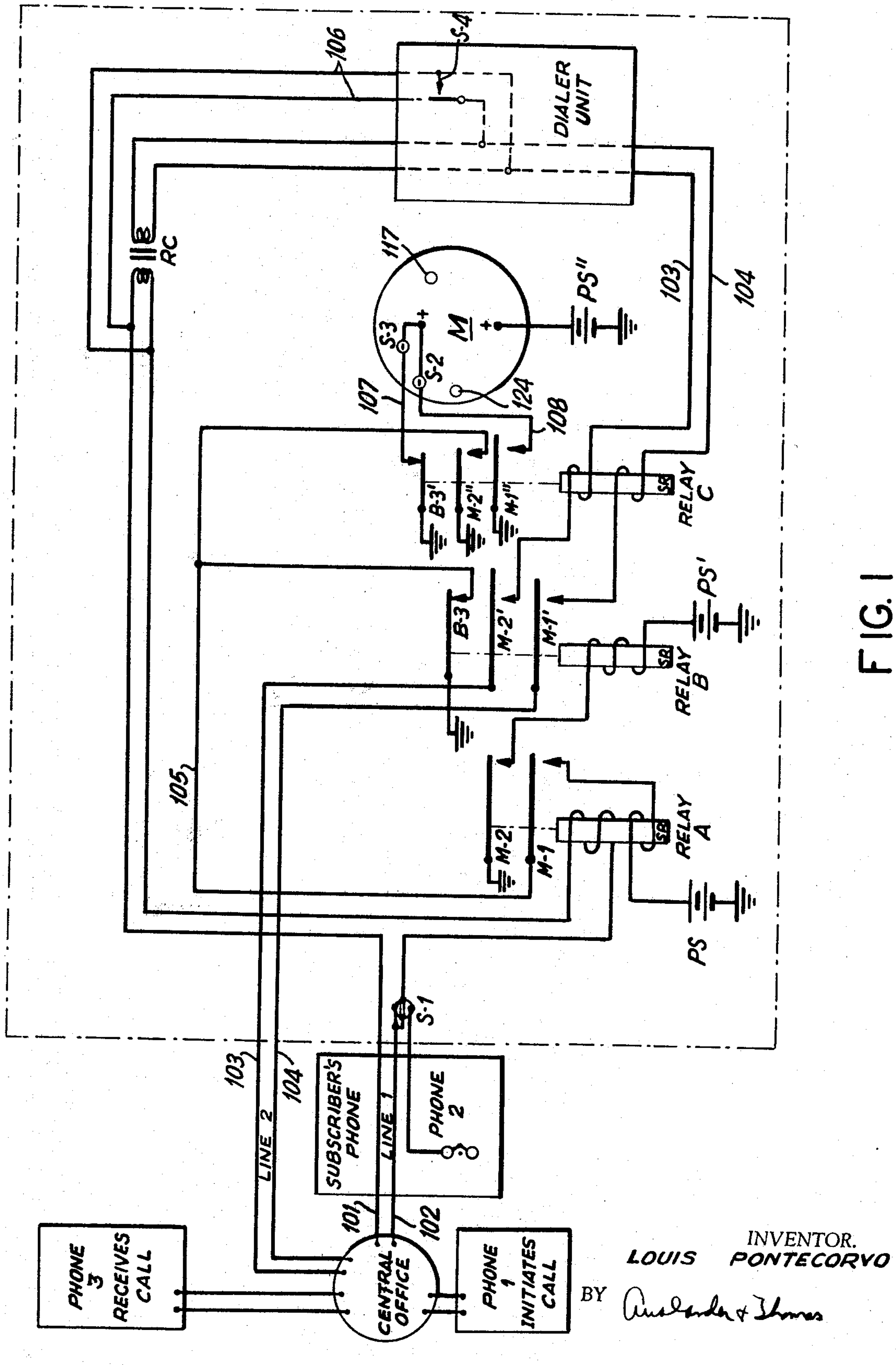
FIG. 1 is a schematic diagram of the system of the present invention.
Figure 4:
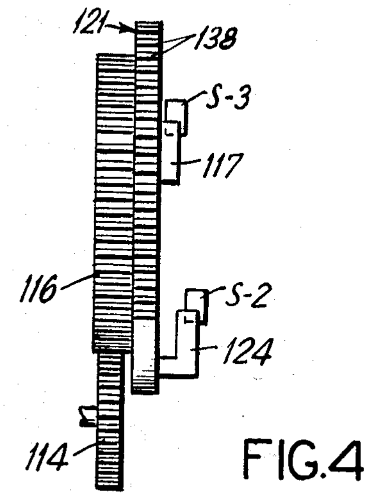

FIG. 4 is a side elevation of the cam and gear configuration of FIG. 1.

FIGS. 5 through 9 are schematic details of the sequential actuation of the switch and cam configuration of FIG. 3 of the present invention.

Referring now to the figures in greater detail, where like reference numbers denote like parts in the various figures.

As shown in FIG. 1, the initiating phone 1 sends the call through the central office and power from the central office enters the subscriber's phone 2 through a first line shown as line 1 having connecting lines 101, 102. A switch S1 on subscriber's phone 2 interconnects connecting line 102 with the relay arrangement of the present invention as hereinafter more fully described, connecting line 102 as switched by switch S–1 and transfers the ring signal carried thereon to relay A, thereby bypassing the ringing means and closed cradle on subscriber's phone 2. As shown in FIG. 2, switch S–1, shown therein as switch 115, is manually actuatable and the actuation means therefor are readily accessible on the unit.

The signal on connecting line 102 through switch S–1 is then carried to the primary winding relay A through repeat coil RC and then back to the central office on the other side of the first line shown as 101.

The sending of the signal through connecting line 102 actuates relay A, and contact M–1 makes contact holding relay A in actuated position, closing the circuit between contact M–1 and relay A and the power source PS of relay A sending a current over line 105 through contact B–3 to ground.

At the same time, contact M–2 makes contact which in turn actuates relay B which includes its own local power source PS′.

Relay B includes contact M–1′, M–2′ and break contact B–3 which are then actuated. Contacts M–1′ and M–2′ close the circuit between the second telephone line having connecting lines 103, 104 through relay C, the second telephone line 103, 104 carrying the dial tone signal, through the dialer unit, thence through repeat coil RC back to the central office.

The closing of the circuit effected by the actuation of contacts M–1′ and M–2′ to relay C actuates the contacts M–1″, M–2″ and break contact B–3′ of relay C.

As the contacts M–1, M–2 and M–1′, M–2′, and M–1″, M–2″, are actuated break contact B–2 of relay B and break contact B–3′ of relay C are actuated to break contact. Contact M–1″ closes the circuit between relay C and line 108, and contact M–2″ closes the circuit between line 105 and relay A.

Because of the intermittent nature of the signal on line 102, it is preferable that relays A and C are slow release relays so that the ring signal current passing through line 102 through the relay A causing contact M–1 to close and connect with power source PS locking the relay A will not release due to the intermittence of the signal.

The resultant circuitry upon sequential actuation of relays A, B and C includes a closed circuit as between connecting lines 101, 102; a closed circuit between the power source PS of relay A through contact M–1 over line 105 through contact M–2″ to ground; a closed circuit of the second line 103, 104 through contacts M–1′ and M–2′ through relay C, thence through the dialer unit and thence through repeat coil RC; and a closed circuit through relay C, contact M–1″ to line 108 to operate the motor M.

When contact M–1″ is made to line 108, the motor M is actuated, thereby initiating the mechanism for actuation of the redialing system hereinafter more fully described. When the redialing system is actuated it connects the second 103, 104 across the repeat coil RC to the first line 101, 102.

Upon the completion of the redial, switch S–4 is actuated through a perforation in the encoded card 109 (FIG. 2) at a point when the card 109 is approaching its starting position.

Switch S–4 signals, over connecting lines 101, 102, (line 106) the central office, such as by momentarily shorting out lines 101, 102, thereby cutting off the audible signal on the first line 101, 102 thus permitting the partly calling on initiating phone 1 to hear either the ring or busy signal emitted from phone 3.

When the party at phone 3 answers, connection is made through repeat coil RC and conversation is maintained. Upon completion of the call, the central office connection is broken thereby cutting off power through the second line 103, 104, releasing relay C and contacts M–1″ and M–2″ break contact. The breaking on contact of M–2″ breaks the circuit on line 105 thereby releasing contact M–1 which breaks the circuit of the power source PS of relay A. The ring signal which was carried on connecting line 102 having already been cut off, the relay A is no longer in circuit and contact M–2 is broken, releasing the ground, and cuts off the power to relay B.

The cutoff of power to relay C actuates break contact B–3′ to make contact through ground with line 107 connecting the motor M power source PS″, actuating the motor M and bringing the redialing system to reset position and is in ready position to function in the event of additional calls to the subscriber's phone 2.

Referring now to the redialing unit 120, as shown in FIG. 2, the redialing unit 120 is a modification of an encoded card dialing system such as shown in U.S. Pat. No. 3,124,659 to Andregg and similar devices of improvements thereon wherein an encoded card 109 having been precoded by selected contacts 130 or other means is caused to be inserted into a slot in the dialer 120 actuating a return mechanism, and as the card is driven upward out of the dialer 120, the desired telephone number encoded on the card 109 is automatically dialed.

As shown in FIG. 2, the redialing unit 120 of the present invention may be a separate unit readily adapted for interconnecting with the subscriber's phone 2 through the first line 101, 102 of the subscriber's phone 2 through switch S–1 shown in FIG. 2 as 115 or the redialer unit 120 may be an integral unit with the subscriber's phone 2 in a similar manner as shown in U.S. Pat. No. 3,124,659 to Andregg. The redialing unit 120 generally comprises a pair of spaced apart vertical members 10 extending upward outward of the redialing unit 120 to act as supports for the encoded card 109. The vertical members 110 are so aligned as to maintain the card 109 in vertical position within the slot 132 of the redialing unit 120. The vertical members 110 may include vertical channels thereon (not shown) adapted to receive the vertical sides of the card 109.

The card 109 is provided with a series of vertically spaced apart perforations 131 along its sides; and as shown in FIG. 3, the card 109 is stopped from ingress into the redialing unit 120 by sprockets 112, positioned within the redialing unit 120 so as to intersect the card 109 within the slot 132, the sprocket teeth 112*a* of sprocket 112 adapted to fit within the perforations 131 of the card 109.

A vertical rack 133 extends upward from the redialing unit 120, the vertical rack 133 being parallel to and spaced apart from the card 109. The rear face of the rack 133 is provided with gear teeth 134. Guide channels 111 within the redialing unit 120 provide a sleeve-like receptacle for the rack 133 when the rack 133 is in depressed position.

A horizontal lip 122 is provided on the top of rack 133 adapted to extend over the top of the card 109. The lip 122 may be an integral part of the rack 133 or as shown in FIG. 3*a*, the lip 122 may be pivotally mounted on the rack 133 so that the lip 122 may be pivoted downward within a central channel 137 on the rack 133 by pins 135 when not in use. Upward rotation of the lip 122 is stopped by the rear flange 136 under lip 122. It is preferable that the lip 122 be mounted so as not to pivot by its own weight so that its horizontal position is maintained unless pressure is exerted to store the lip 122 within the central channel 137.

The rack 133 is adapted to be actuated downward to drive the encoded card 109 into the redialing unit 120 by the meshing of gear teeth 134 with the gear arrangement actuated by the motor M, shown in FIG. 3 as 114.

The depressing of the perforated card 109 into slot 132 by the rack 133 and lip 122 arrangement engages the perforations 131 with the sprocket teeth 112*a* causing the sprocket 112 to rotate in a given direction shown in FIG. 3 as clockwise. A helical wound spring 118 within the sprocket 112 is thereby tightened and when the driving force for the rack 133 is released as hereinafter described, the sprocket wheels 112 will rotate in an opposite direction, shown as a counterclockwise direction impelled by the force of the wound spring 113, driving the encoded card 109 upward through the slot 132, the ascending card 109 causing pulsations which dial the number encoded on the card 109.

As shown in FIG. 1, the encoded card 109 is additionally provided with a supplemental perforation 119 located on the card 109 below the dialing encoding, and upon completion of the dialing pulsations, perforation 119 will pass spring switch 118 which enters perforation 119. Spring switch 118 shown in FIG. 1 as switch S–4 thereby produces a momentary short circuit on the first line 101, 102 as hereinbefore described to signal to central office to cut off the power to the first line.

FIG. 4 illustrates the gear and switch arrangement of FIG. 1. As shown in FIG. 4, the shaft on the motor M actuates gear 114 to rotate. Gear 114 actuates gear 116 to rotation, gear 116 either joined to or on a common shaft with segmented gear 121. Segmented gear 121 has engaging teeth or cogs 138 along only part of its outer periphery. The cogs 138 on gear 121 are adapted to fit into active engagement with the gear teeth 134 of the rack 133. Cams 124, 117 on gear 121 are so disposed on gear 121 as to lie in an intersecting path with the switches S–2 and S–3 respectively.

Upon rotation of segmented gear 121, the active engagement of cogs 138 with rack teeth 134 will drive the encoded card 109 into the redialer 120. When the card 109 has been completely lowered into the redialer 120, cam 124 opens switch S–2 which is preferably a microswitch and the gear cogs 138 of gear 121 have disengaged from the rack teeth 134. The opening of the switch S–2 will break the circuit on line 108 to the motor M and the encoded card 109 is raised through the dialer by spring wound sprockets 112 as hereinbefore described, causing the redialing of the desired number encoded thereon.

When the redialed call is completed and the circuit broken so that the power to relays A, B and C is cut off, contact B–3' closes circuit between the power source PS'' of the motor M through switch S–3 on line 107 to ground, thereby actuating the motor M, rotating gear 121 until cam 117 opens switch S–3 which is also preferably a microswitch. The rotation of gear 121 places its gear teeth 138 in ready position with the rack gear teeth 134 for the next call.

As shown in FIGS. 5–9, a single cam 139 on gear 121 combined with switches S–5 and S–6 may be employed.

As shown in sequence in starting position, cam 139 holds switch S–6 in open position thereby breaking the circuit on line 107 to the motor M.

Figure 6:
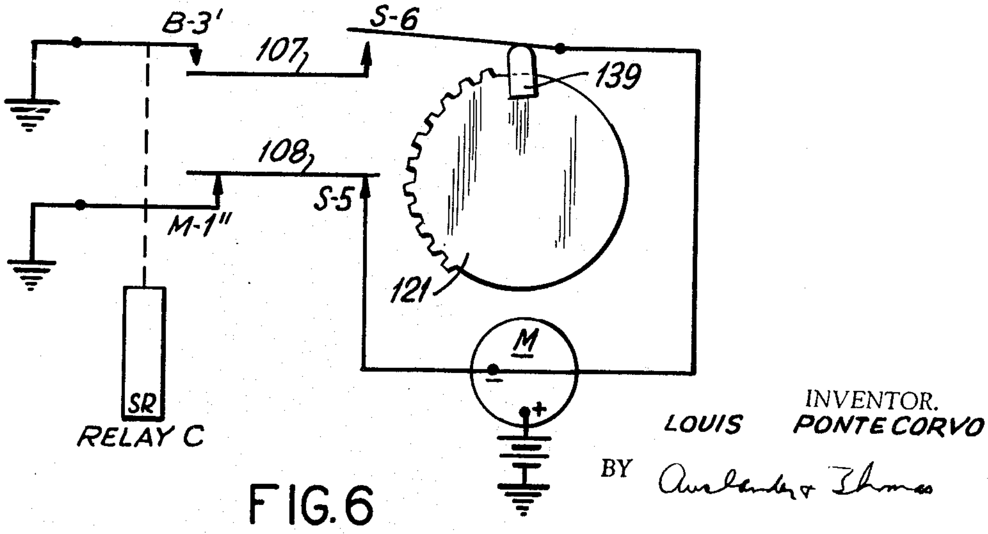
Figure 7:
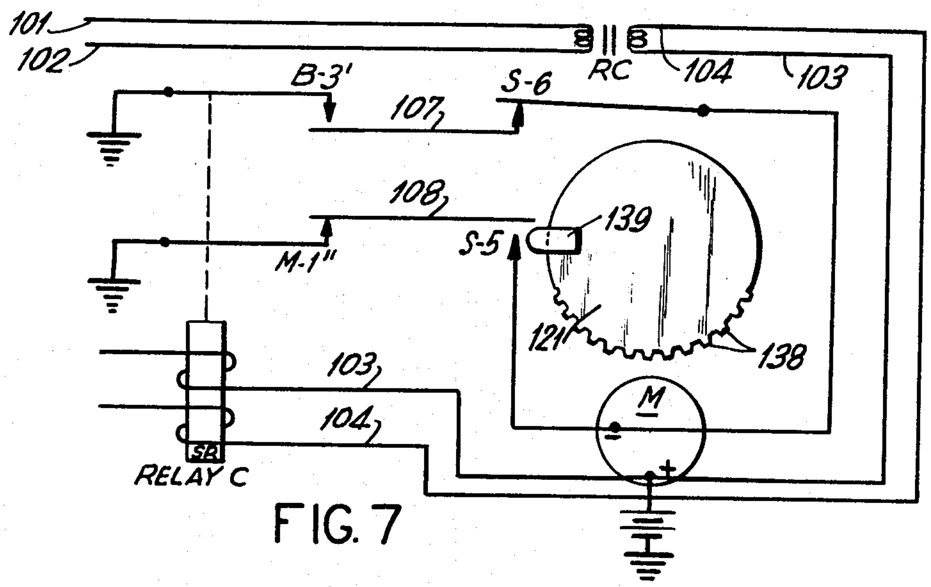
Figure 8:
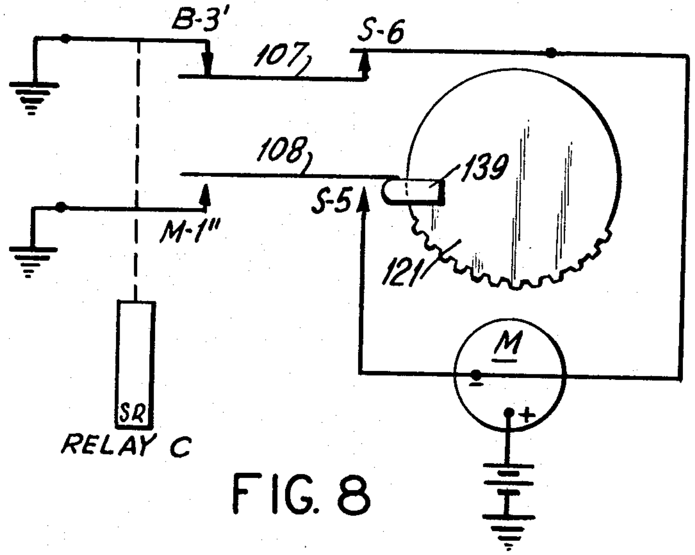

The circuit on line 108 is also broken, there being no contact. When the call is initiated as shown in FIG. 6, the circuit through line 108 is made by contact M–1'' to the motor M and the circuit to line 107 is broken by contact B–3'. The motor M is operative and gear 121 rotates to engagement with rack 133.

When the gear cogs 138 of gear 121 have traversed the rack gear teeth 134, inserting card 109 into the redialer 120, cam 139 reaches switch S–5 and opens the same, thereby breaking the circuit on line 108, turning off the motor M. There is no complete circuit to the motor M through either lines 107 or 108.

Figure 5:
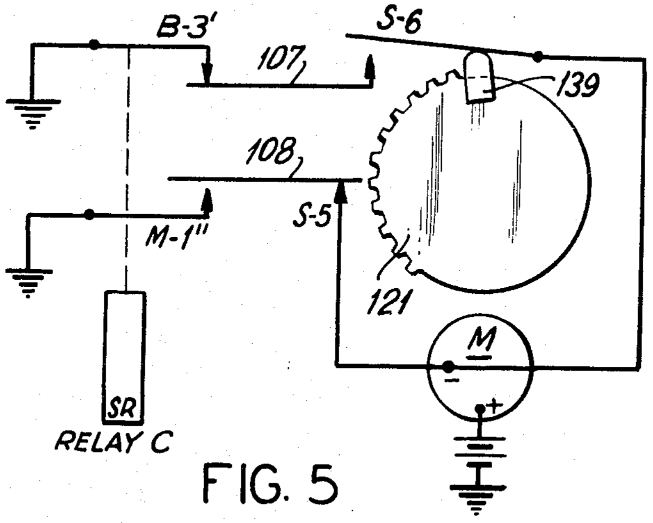
Figure 9:
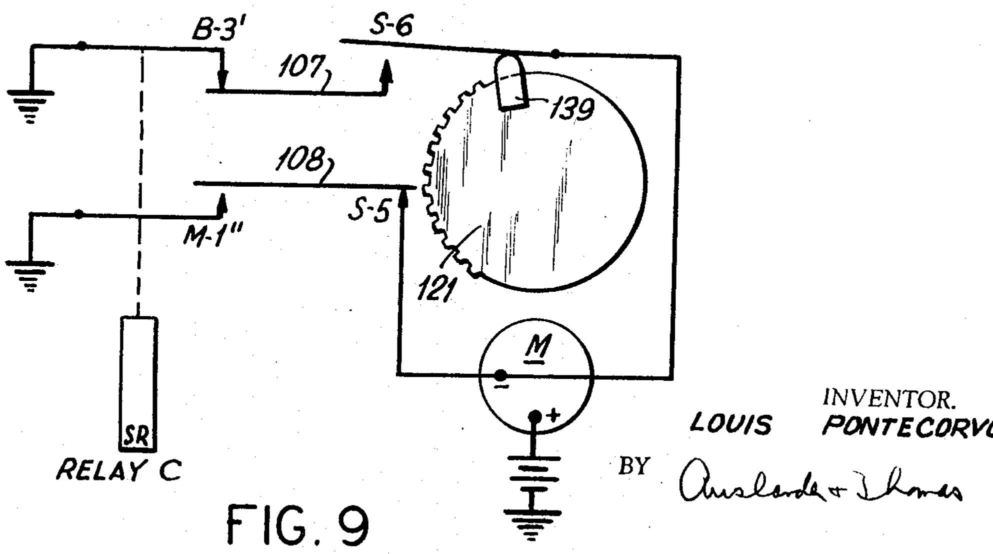

Upon the completion of the call, relay C becomes inoperative as hereinbefore described, contact B–3' is made and the circuit on line 107 is completed, thereby causing the motor M to become operative. Gear 121 rotates until the cam 139 opens switch S–6 breaking the circuit on line 107 and as shown in FIG. 9, the start position of FIG. 5 is attained.

While the cams 117, 124 and 139 have been shown on the partially cogged gear 121, they may be readily arranged so as to be carried on gear 116. Although the power sources PS, PS' and PS'' are shown as separate units, a single unit source or a two-unit source may be employed.

In operation, the redialing unit may be employed as an automatic dialer by the subscriber. Switch S–1 (115) is set so as to send the ring signal to the subscriber's phone 2 ring mechanism, and the subscriber's phone 2 is operative for normal use. An encoded card 109 selected by the subscriber may be manually placed in the dialer 120, and in such case it is generally preferable that the lip 122 on the rack 133 be positioned either within the declivity 137 or otherwise removed so that ingress and egress of the card 109 is facilitated. The dialer 120 is then operable in a like manner as described in U.S. Pat. No. 3,124,659 to Andregg.

When the subscriber desires to employ the call switching system of the present invention, the switch S–1 (115) is set as heretofore described and an encoded card 109 is positioned on the rack 133 with the lip 122 in horizontally extended position. Any incoming calls to the subscriber's phone 2 will then be transferred to the station encoded on card 109 as hereinbefore described.

The terms and expressions which are employed are used as terms of description; it is recognized, though, that various modifications are possible within the scope of the invention claimed.

Having thus described certain forms of the invention in some detail, what is claimed is:

1. A device adapted to automatically transmit a call made to a telephone instrument comprising: code bearing means adapted to generate signals, code translation and generating means actuatable upon receipt of said code bearing means, said code bearing means being brought into active engagement with said translation and generating means upon receipt of a call to said telephone instrument; wherein the improvement comprises power means actuatable by a power source adapted to bring said code bearing means into active engagement with said translation and generating means; said power means comprising a motor adapted to actuate gear means; said gear means including; a gear having cogs along a part of its peripheral surface; a rack gear; the cogs of said partially cogged gear adapted to drive said rack gear upon engagement; cam means on said gear means adapted to actuate said circuit breaking switches; said code bearing means including card holding means; said rack gear adapted to actuate said code bearing card holding means to bring said code bearing holding means into active engagement with said translation and generating means, and means for electrically operating and controlling said power source including: means for the initiation of a circuit by the incoming signal on one of the lines of said telephone instrument; a plurality of relays interconnecting said initiated circuit to said power means; said relays adapted to be independently maintained in closed circuit; means to maintain said power means in circuit upon cutoff of said incoming signal; switching means adapted to break the circuit of said power means after active engagement of said code bearing means with said translation and generating means; transfer means adapted to transfer said generated signals on to a second line of said telephone directed to a station predetermined by said code bearing means and reset means to reset said code bearing means for subsequent use upon the cessation of said retransmitted call.

2. The invention of claim 1 wherein switching means are provided for said telephone adapted to switch said incoming signal to the first of said relays.

3. The invention of claim 2 wherein said switching means on said incoming signal diverts said signal from the ring mechanism of said telephone.

4. The invention of claim 1 wherein said code bearing means is a card dialer card.

5. The invention of claim 1 wherein said translation and generating means comprises a card dialing unit.

6. The invention of claim 1 wherein said rack gear includes a horizontal lip adapted to bear upon said code bearing means.

7. The invention of claim 6 wherein said horizontal lip is downwardly hinged.

8. The invention of claim 1 wherein said translation and generating means further includes switch means adapted to be actuated after translation and generation of the signals of the code bearing means, said switch means adapted to short-out said incoming signal.

9. The invention of claim 1 wherein said transfer means includes a repeat coil.

10. The invention of claim 1 wherein said reset means comprises drive means to disengage said code bearing means from said translation and generating means, contact means adapted to close a circuit to said power means upon cessation of said retransmitted call and circuit breaking means adapted to break said circuit to said power means.

11. The invention of claim 10 wherein said circuit breaking means includes switch means in said power means circuit and cam means adapted to intersect and open said switch means.

12. The invention of claim 11 wherein said cam means is further adapted to open the circuit of said power means after active engagement of said code bearing means with said translation and generating means.

13. The invention of claim 12 wherein said cam means includes a first cam and a second cam, said first cam adapted to open the circuit of said power means after active engagement of said code bearing means with said translation and generating means, said second cam adapted to break the circuit to said power means made upon the cessation of said retransmitted call.

14. The invention of claim 1 wherein said code bearing means comprises an encoded card; said translation and generating means comprises a card re-dialer; lip means on said rack gear adapted to depress said encoded card within said card dialer; said incoming signal comprises the ring signal to said telephone; said switching means adapted to break the circuit of said power means upon engagement of said encoded card within said re-dialer comprises cam means on said gear means; and said reset means comprises contact means adapted to close a circuit to said power means upon cessation of said retransmitted call and circuit breaking means on said gear means adapted to break said circuit.

15. The invention of claim 14 wherein said encoded card includes a perforation at a point below said encoding adapted to permit contact of a switch to short circuit the signal on said incoming signal.

References Cited

UNITED STATES PATENTS

| | | | |
|---|---|---|---|
| 2,274,759 | 3/1942 | Wicks | 179—18 |
| 3,001,027 | 9/1961 | Armstrong et al. | 179—5 |
| 3,124,659 | 3/1964 | Andregg et al. | 179—90 |
| 3,268,666 | 8/1966 | Odom | 179—18 |

KATHLEEN H. CLAFFY, Primary Examiner

A. B. KIMBALL, Jr., Assistant Examiner

U.S. Cl. X.R.

179—90